(12) United States Patent
Morris et al.

(10) Patent No.: US 12,312,486 B2
(45) Date of Patent: May 27, 2025

(54) COATING COMPOSITION COMPRISING INTEGRATED FUNCTIONALITY

(71) Applicant: UNIVERSITY COLLEGE CORK—NATIONAL UNIVERSITY OF IRELAND, Cork, Cork (IE)

(72) Inventors: Michael A. Morris, Midleton (IE); Sibu C. Padmanabhan, Silversprings (IE); Joseph P. Kerry, Kilmichael Macroom (IE); Malco C. Cruz-Romero, Glanmire (IE)

(73) Assignee: UNIVERSITY COLLEGE CORK—NATIONAL UNIVERSITY OF IRELAND, Cork, Cork (IE)

( * ) Notice: Subject to any disclaimer, the term of this patent is extended or adjusted under 35 U.S.C. 154(b) by 986 days.

(21) Appl. No.: 17/253,870

(22) PCT Filed: Jun. 21, 2019

(86) PCT No.: PCT/EP2019/066560
§ 371 (c)(1),
(2) Date: Dec. 18, 2020

(87) PCT Pub. No.: WO2019/243623
PCT Pub. Date: Dec. 26, 2019

(65) Prior Publication Data
US 2021/0371696 A1    Dec. 2, 2021

(30) Foreign Application Priority Data
Jun. 21, 2018  (EP) .................... 18179171

(51) Int. Cl.
| | | |
|---|---|---|
| *C09D 153/00* | (2006.01) | |
| *B05D 1/02* | (2006.01) | |
| *B05D 1/18* | (2006.01) | |
| *B05D 3/06* | (2006.01) | |
| *B05D 3/10* | (2006.01) | |
| *B05D 3/14* | (2006.01) | |
| *C08K 5/00* | (2006.01) | |
| *C08K 5/56* | (2006.01) | |
| *C09D 5/14* | (2006.01) | |
| *C09D 7/20* | (2018.01) | |
| *C09D 7/63* | (2018.01) | |

(52) U.S. Cl.
CPC ............. *C09D 153/00* (2013.01); *B05D 1/02* (2013.01); *B05D 1/18* (2013.01); *B05D 3/066* (2013.01); *B05D 3/101* (2013.01); *B05D 3/147* (2013.01); *C08K 5/0058* (2013.01); *C08K 5/56* (2013.01); *C09D 5/14* (2013.01); *C09D 7/20* (2018.01); *C09D 7/63* (2018.01); *B05D 2201/06* (2013.01); *B05D 2507/01* (2013.01)

(58) Field of Classification Search
None
See application file for complete search history.

(56) References Cited

U.S. PATENT DOCUMENTS

| 10,543,175 B1* | 1/2020 | Penhasi .................. C08K 5/09 |
| 2008/0292800 A1* | 11/2008 | Murayama .......... C23C 18/1254 |
| | | 427/385.5 |

FOREIGN PATENT DOCUMENTS

| EP | 3138880 A1 | 3/2017 |
| JP | 2005-077893 A | 3/2005 |
| WO | 2006049368 A1 | 5/2006 |
| WO | 2008028640 A2 | 3/2008 |
| WO | 2008156680 A1 | 12/2008 |

OTHER PUBLICATIONS

Database WPI Week 200528 Thomson Scientific, London, GB; AN 2005-266515 XP002785314.

* cited by examiner

*Primary Examiner* — Ramsey Zacharia
(74) *Attorney, Agent, or Firm* — Nixon Peabody LLP; David S. Resnick; Nicole D. Kling

(57) ABSTRACT

A coating composition for applying a very thin film coating to a substrate such as a polymeric film comprises a copolymer such as a block copolymer (BCP) that is compatible with the substrate, an alcohol solvent or solvents capable of dissolving the copolymer, a hydrolysed metal alkoxide precursor, a carboxylic acid stabiliser, and an active agent in an ionic, molecular, or small nanoparticle form. The active agent is configured to provide a functionality to the coating composition, selected from antimicrobial, antifungal, barrier, therapeutic, electrical, electronic, magnetic and optical. The composition is a sol comprising a continuous non-sedimentable/stable suspension of very small sized (of nano order) amorphous inorganic polymers in their oligomeric or polymeric state, and comprising the active agent dispersed in a hydrolysed metal alkoxide-BCP matrix. Substrates coated with very thin coatings are also provided, including coated LDPE which is activated before coating by UV/ozone, plasma or corona treatment prior to deposition of a wetting layer.

9 Claims, No Drawings

COATING COMPOSITION COMPRISING INTEGRATED FUNCTIONALITY

CROSS-REFERENCE TO RELATED APPLICATIONS

This application is a 35 U.S.C. § 371 National Phase Entry Application of International Application No. PCT/EP2019/066560 filed Jun. 21, 2019, which designates the U.S. and claims benefit under 35 U.S.C. § 119(a) of EP Provisional Application No. 18179171.6 filed Jun. 21, 2018, the contents of which are incorporated herein by reference in their entireties.

FIELD OF THE INVENTION

The present invention relates to a coating composition comprising integrated functionality, and methods for the manufacture of the coating composition. Also contemplated are coated substrates coated with the coating composition, and method for the manufacture of the coated substrates.

BACKGROUND TO THE INVENTION

Polymer films are widely preferred in packaging applications including food wrapping, pharmaceutical, electronic, horticulture and medical device packaging due to their low-cost processability, reasonably inert nature, optical properties (transparency, colour), and manufacturability into flexible, semi-rigid or stiff materials of required size and shape. Active packaging is a rapidly developing field to extend the shelf-life of packaged products. Food wastage through bacterial attack or through moisture and gas penetration through the packaging is a global problem and if controlled or if the bacterial lag phase is extended could extend the shelf-life of food, which lessens the wastage and support food and health-based economy.

The low reactivity of plastic films due to their lack of functionality is a bottleneck in the development of technologies for their modification and integration/deposition of active materials. The cheapest polymer material used for most of the plastic packaging applications is polyethylene (PE) films. However, PE surfaces are the most difficult surfaces among plastic materials for applying coatings on them due to their inherent high chemical inertness.

It is evident that polymer packaging is not an environmentally friendly method. However, the use of polymer packaging cannot be abruptly stopped considering its usefulness in protecting and extending the shelf life of products packed within. The trade-off between its usefulness and environmental issues and the lack of alternative materials to fully overtake their usage would mean polymer materials will be in use for quite some time, until alternative packaging products are developed and produced sufficiently. The one thing packaging industry could do to reduce the environmental burden is to increase the recyclability of plastics being used. Currently, in packaging, the use of multi-layered films considerably decreases their recyclability. One way to increase the recyclability is to decrease the number of layers of different materials in a multi-layered film. Considering the economics and wide applicability of PE films, one way of increasing the potential of its recyclability and adding value to their use is by integrating required functionality to PE films and use them as such or in lamination (multiple PE films with different required functionalities) instead of multi-layered films.

The prior art indicates that a suitable thin film coating method for PE films is not known. Instead, there have been methods and compositions reported for deposition of thick coatings/paints on plastic base materials such as polymethyl methacrylate (PMMA), aromatic polycarbonate-based resins such as polyphenylene carbonate, polyphenylene carbonate, aromatic polyester-based resins such as polyethylene terephthalate (PET), polyethylene terephthalate (PET) (European Patent Publication No. EP 3 138 880 A1 & International Patent Publication No. WO 2015/166858); and on PVC, cloth for tent (Tarpaulin) and polycarbonate base materials (International Patent Publication No. WO/2006/049368). A third patent discusses an antireflective coating on polyolefin base materials (Japanese Patent Publication No. JPO 2005077893) as one possibility to coat their composition on polyolefin surfaces. However, the inherent chemical inertness of polyolefins is not taken care of in their methods, which indirectly means the coating may not function adequately in real world applications. The patent WO/2006/049368 which discusses coatings on Tarpaulins (made of polyethylene yarns) also does not discuss the activation of PE surface which can seriously influence the coating success.

The prior art WO 2015/166858 discloses about formulations containing a multitude of chemicals, reagents, solvents, binder, surface active agents, chelating agents and precursors for rendering required UV absorbing and anti-bacterial features to the final product which is a coating of minimum 1 µm (micrometer) thickness. For example, they mix at least three hydrolysable silicon compounds to make the dispersion such as a silylated benzophenone-based compound, a silylated antimicrobial functionalized compound and a partially or completely hydrolysed organosilicon compound. They also add at least two types of chelating agents in the likes of high molecular weight copolymers or a commercial block copolymer such as DISPERBYK 190.

The patent WO/2006/049368 discloses compositions for base surface coatings, where the base materials are plastic such as PVC, cloth for tent (Tarpaulin) or polycarbonates, or metal or ceramic textile, and a second antisoiling and weatherable coating over the first coating to reduce city smoke and dust particle contamination of coated surfaces. Organic alkoxysilanes are just one component in their composition containing a multitude of components to prepare thick coatings. The silicon-acrylic polymer they use are prepared by a complex preparation process. They also add preformed commercially available metal oxide particles such as titania (Degussa P25) and/or silica (Ludox LS-30, 30 wt % SiO, Dupont), alumina, indium-tin oxide, discharger materials, surface active agents; and two or more solvents from methanol, ethanol, isopropanol, butanol, and toluene for adjusting the curing speed of the coatings produced. The silicon-based resin and silicon-acryl-based copolymer they use are mixtures of two or more of alkoxysilanes including tetrametoxysilane, metyltrietoxysilane, tetrapropoxysilane, tetrabutoxysilane, silanol and methyltrimetoxysilane.

It is to be stressed that the surface, interfacial and drying sciences of thin and thick coatings are very different and not comparable.

It is an object of the invention to overcome at least one of the above-referenced problems.

SUMMARY OF THE INVENTION

The present invention discloses thin film coating compositions which are intended to render oxygen or moisture barrier properties, antimicrobial activity, and other activities by reacting a minimum number of chemical constituents such as a metal alkoxide like titanium alkoxide, zirconium alkoxide or silicon alkoxide and one chelating agent (for example, acetic acid) in a medium of solvent such as ethanol, isopropanol or water or the mixture of two or three of them in a required ratio along with the required functionality (such as silver nitrate or zinc acetate/nitrate etc.). The present invention also preferably also employs a selected block-copolymer dissolved in a suitable solvent such as ethanol, isopropanol or ethyl acetate that is generally less than 0.5% of the total composition. The block-copolymer here is selected to make the solution compatible to the base material selected to be coated, as opposed to the prior art where a block-copolymer is employed as a dispersing/chelating agent. The present preferably employs the compositions as very thin coatings of the order of less than 150 nm dry thickness as compared to thick coatings (above 1 µm) in the case of the prior art. Compared to the prior art dispersions/slurries, which contain solid particles of the order of 5 nm or above (up to 50 or 100 nm), the present invention is a sol which is a continuous non-sedimentable/stable suspension of small nanosized (i.e. less than 50 nm, preferably less than 10 nm) amorphous inorganic polymers in their oligomeric or polymeric state. The functional (active) materials added will also be incorporated as ionic species (Ag, Zn, Cu, Ga etc.) or as molecular components (chitosan, carvacrol, thymine etc.) or as very tiny solids of less than 5 nm as opposed to the case of prior arts. The very small size of the polymers in the sol (i.e. less than 50 or 10 nm) allows it to be stabilized by Brownian motion as opposed to the referenced prior art's dispersions which are stabilized by acid/base, surfactants and/or dispersing agents such as high molecular weight polyethylene oxide groups. This Brownian motion induced stability clearly demonstrates that the sol does not comprise large particles, which is in contrast to the compositions of the prior art (EP 3138880 A1, WO 2015/166858 and WO/2006/049368) which disclose dispersions of electrostatically or sterically stabilized solid particles to make thick coatings.

The present invention thus addresses the need for a method of continuous and homogenous deposition of active materials on substrates such as polymer films, ceramics, metals, silicon and glass, to provide functional substrates. The active materials may be ions, molecules, compounds, or nanoparticles, and may have antimicrobial, barrier, optical, magnetic, electrical or electronic functionalities. The invention comprises dissolving a copolymer, typically a block copolymer (BCP), in a suitable solvent, and then mixing the dissolved copolymer with a hydrolysed metal alkoxide and active agent to provide a coating composition in the form of a colloidal dispersion (sol) comprising the active agent dispersed in a hydrolysed metal alkoxide-BCP matrix. In the composition, the active agent and metal alkoxide form a continuous homogeneous system with possible linkages (covalent, coordinate or hydrogen bonding) as in an inorganic oligomer or polymer system. The composition may be applied to a substrate, typically as a very thin coating (i.e. less than 250 nm) by a suitable coating process, for example dip coating, spray coating or slot die coating. In particular, the invention provides a method of homogenously coating a non-reactive substrate such as high or low density polyethylene (HDPE or LDPE) with a coating composition comprising an active agent such as an antimicrobial, in which the copolymer is solubilised in a solvent system that is compatible with the LDPE, and in which the LDPE surface is activated by UV/ozone, plasma or corona treatment prior to addition of a wetting agent. The invention provides for polymer films substrates, and other substrates such a silicon, ceramic, metal, metal alloy or glass substrate that have integrated functionalities such as antimicrobial, gas or moisture barrier, magnetic or optical properties.

In a first aspect, the invention provides a coating composition comprising:
  a copolymer preferably that is compatible with the substrate to be coated;
  alcohol solvent capable of dissolving the copolymer;
  a hydrolysed metal alkoxide precursor;
  optionally a carboxylic acid stabiliser; and
  an active agent, typically selected from an ion, molecule, compound or nanoparticle.

In another aspect, the invention provides a method of forming a coating composition, for example a coating composition of the invention, comprising the steps of:
  dissolving a copolymer (typically a BCP), in a compatible solvent of to provide a copolymer solution, and
  mixing the copolymer solution with a hydrolysed metal alkoxide precursor and an active agent to provide a coating composition, typically as a colloidal sol comprising the active agent dispersed in a hydrolysed metal alkoxide copolymer matrix.

The composition typically takes the form of a colloidal dispersion (sol) comprising the active agent dispersed in a hydrolysed metal alkoxide-copolymer matrix.

In another aspect, the invention provides a coated substrate comprising a substrate spray, dip or slot die coated with a coating composition of the invention. Typically, the substrate is selected from a polymer, metal, metal alloy, ceramic, silicon or glass substrate. Typically, the coating is a very thin coating (i.e has a thickness of less than 250 nm why the coating is dry).

In another aspect, the invention provides a method of forming a coated substrate, typically a coated substrate of the invention, comprising the steps of:
  dissolving a copolymer, typically BCP, in the solvent to provide a copolymer solution;
  mixing the copolymer solution with a hydrolysed metal alkoxide precursor and an active agent to provide a coating composition as a colloidal dispersion (sol) comprising the active agent dispersed in a hydrolysed metal alkoxide-copolymer matrix;
  depositing the coating composition onto a surface of a substrate (typically as a very thin film having a thickness of less than 250 nm) by spray, dip or slot die coating; and
  curing the coating on the substrate.

In another aspect, the invention provides a method of forming a coated polyolefin, for example coated polyethylene, comprising the steps of:
  dissolving a copolymer (preferably a BCP) in the solvent to provide a copolymer solution;
  mixing the copolymer solution with a hydrolysed metal alkoxide precursor and an active agent to provide a coating composition as a colloidal dispersion (sol) comprising the active agent dispersed in a hydrolysed metal alkoxide-copolymer matrix;
  activating a surface of the polyolefin by UV/ozone, plasma or corona treatment, and depositing an alcohol-based wetting layer on to the activated polyolefin surface;
  depositing the coating composition onto a surface of a substrate (typically as a very thin film) by spray, dip or slot die coating; and
  curing the coating on the substrate, in which the solvent is optionally selected from ethyl acetate/ethanol, ethyl acetate/isopropyl alcohol (IPA), and ethyl acetate/tert-butanol.

In an embodiment of the invention, the product and method of the invention employs one chelating agent.

In an embodiment of the invention, the composition comprises less than 0.5% copolymer (i.e. block copolymer) by weight.

In an embodiment of the invention, the coating composition is applied to the substrate as a very thin film (i.e. having a thickness when dry of less than 250 nm, 200 nm, or 150 nm).

In an embodiment of the invention, the active agent is present in the composition in an ionic or molecular form, or in the form of nanoparticles having a dimension of less than 5 nm.

In an embodiment of the invention, the composition is a colloidal dispersion (sol) comprising a continuous non-sedimentable/stable suspension of very small sized (of nano order) amorphous inorganic polymers in their oligomeric or polymeric state.

In an embodiment, the coating composition comprises:
0.1 to 1.0% of a block-copolymer (wt/vol);
0.1 to 10% hydrolysed metal alkoxide precursor;
0.1 to 10% carboxylic acid stabiliser;
0.1 to 3.0% active agent (wt/vol); and
alcohol solvent capable of dissolving the block-copolymer.

In an embodiment, the coating composition comprises:
0.1 to 0.5% of a block-copolymer (wt/vol);
0.5 to 5% hydrolysed metal alkoxide precursor;
0.5 to 5% carboxylic acid stabiliser;
0.1 to 3.0% active agent (wt/vol); and
alcohol solvent capable of dissolving the block-copolymer.

In an embodiment of the coating composition:
the active agent is present in an ionic or molecular form, or as nanoparticles having a dimension of less than 5 nm; and
the sol comprises a continuous non-sedimentable/stable suspension of very small sized (of nano order) amorphous inorganic polymers in their oligomeric or polymeric state.

In an embodiment of the coating composition:
the solvent is selected from a mixture of ethyl acetate/IPA, ethyl acetate/tert-butanol, and ethyl acetate/ethanol, in which the solvent optionally includes water, typically deionised/distilled water; and
the BCP is polystyrene-b-poly(X), where X is selected from ethylene oxide, 4-vinylpyridine, methyl methacrylate, acrylic acid and lactic acid.

Also provided is a method of forming a coated substrate comprising the steps of depositing a coating composition of the invention to a substrate. In one embodiment, the substrate is polyolefin. In one embodiment, the coating composition is deposited on to the substrate as a very thin film having a thickness of less than 200 nm. In one embodiment, the surface of the polyolefin substrate is activated by UV/ozone, plasma or corona treatment, and an alcohol-based wetting layer is deposited on to the activated polyolefin surface.

Other aspects and preferred embodiments of the invention are defined and described in the other claims set out below.

DETAILED DESCRIPTION OF THE INVENTION

All publications, patents, patent applications and other references mentioned herein are hereby incorporated by reference in their entireties for all purposes as if each individual publication, patent or patent application were specifically and individually indicated to be incorporated by reference and the content thereof recited in full.

Definitions and General Preferences

Where used herein and unless specifically indicated otherwise, the following terms are intended to have the following meanings in addition to any broader (or narrower) meanings the terms might enjoy in the art:

Unless otherwise required by context, the use herein of the singular is to be read to include the plural and vice versa. The term "a" or "an" used in relation to an entity is to be read to refer to one or more of that entity. As such, the terms "a" (or "an"), "one or more," and "at least one" are used interchangeably herein.

As used herein, the term "comprise," or variations thereof such as "comprises" or "comprising," are to be read to indicate the inclusion of any recited integer (e.g. a feature, element, material, characteristic, property, method/process step or limitation) or group of integers (e.g. features, elements, materials, characteristics, properties, method/process steps or limitations) but not the exclusion of any other integer or group of integers. Thus, as used herein the term "comprising" is inclusive or open-ended and does not exclude additional, unrecited integers or method/process steps.

The process presented here enables the deposition of one or a combination of the surface of substrates such as polymers, ceramics, silicon, metals, metal alloys and glass. The integratable functionalities can be in the form of ions, molecules, compounds or nanoparticles having applications such as antimicrobial, antifungal, barrier, therapeutic, electrical, electronic, magnetic and optical. This generic deposition process involves the formulation of a coating solution containing a selected copolymer, preferably a BCP, a selected metalorganic precursor, such as titanium alkoxide, zirconium alkoxide or silicon alkoxide, where the alkoxide can be tert-butoxide or lower chain length alkoxide such as isobutoxide, isopropoxide, ethoxide or methoxide, a stabilizer and a selected required functionality all homogeneously dispersed in a suitable solvent or solvent mixture. The solvent and stabilizer/homogenizer can be selected/changed based on the substrate (for chemical compatibility), on which the coating is to be made, and the functionality to be integrated. The solvent is selected from a list of alcohols and the stabilizer is selected from a list of carboxylic acids. In case of polymer coatings, especially polyolefins, due to their chemically inert nature, the polymer needs to be activated before the deposition process. All other substrates are merely cleaned for removal of dirt, grease and other environmental contaminants prior to the coating process. The film can be deposited by either a dip, spray or slot die assisted coating process. The film is generally deposited as a very thin film. The invention presented here enables a continuous/homogeneous deposition of active (antimicrobial, barrier, magnetic, optical, electrical and electronic) functionalities on the surface of plastic films that will have applications in packaging of foods, medical devices, pharmaceuticals and horticulture products, medical device coatings as well as in flexible electronics, UV blocking films and antireflective surfaces. The invention will enable, in general, the functionalisation of substrates such as polymer, ceramics, metals, metal alloys, silicon and glass which will present innumerable opportunities in various fields for researchers skilled in the art.

The coating composition of the present invention is provided as a colloidal dispersion (sol). The sol is a continuous non-sedimentable/stable suspension of small nano-sized (i.e. less than 50 nm, preferably less than 10 nm) amorphous inorganic polymers in their oligomeric or polymeric state. The functional (active) materials added will also be incorporated as ionic species (Ag, Zn, Cu, Ga etc.) or as molecular components (chitosan, carvacrol, thymine etc.) or as very tiny solids (nanoparticles) of less than 5 nm as opposed to the case of prior arts. The very small size of the amorphous inorganic polymers present in the sol allows it to be stabilized by Brownian motion as opposed to the referenced prior art's dispersions which is stabilized by acid/base, surfactants and/or dispersing agents such as high molecular weight polyethylene oxide groups. This Brownian motion induced stability clearly demonstrates that the sol is not consisted of large particles as opposed to the discussed prior arts (EP 3138880 A1, WO 2015/166858 and WO/2006/049368) which use dispersions of electrostatically or sterically stabilized solid particles to make thick coatings.

As used herein the term "active agent" refers to a component such as an ion, compound, molecule, particle or nanoparticle. In one embodiment, the active agent is configured to provide a functionality to the coating composition, selected from antimicrobial, antifungal, moisture or gas barrier, therapeutic, electrical, electronic, magnetic and optical. Thus, the active agent may be an antimicrobial agent (i.e. a silver ion, or a nanoparticle), a metal, an electrically conducting material, a magnetic material, a therapeutic material or an optically active agent. Examples of antimicrobial agents include ions of silver, zinc, magnesium or gallium, or their nanoparticles, or any of the available natural antimicrobials (e. g. carvacrol, thymine etc.), or a polysaccharide such as chitosan. Similarly suitable electronic, magnetic, optical or therapeutic functionality can also be incorporated. Active agents having optical functionalities include rare earth metals (Neodymium, Yttrium, Scandium, Cerium, Terbium and Lanthanides, group IV elements such as carbon and silicon and metamaterials consisting of gold or any other suitable metal nanoparticles. Active agents with magnetic properties include metals such as iron, cobalt or nickel. Any element or their alternative form or phase that have electrical or electronic properties including graphite. Any other inorganic or organic elements or compounds with UV-absorption, reflective or antireflective properties such as MgZnO, MgF2, aluminium etc. that are compatible with the process and materials in question can be employed as active agents. Any organic or inorganic elements or compounds that have therapeutic or antiinfection functionalities such as silver, magnesium, zirconium, zinc, plant derived alkaloids, chitosan etc. In one embodiment, the coating composition comprises 0.001 to 5% of active agent, for example 0.1 to 3% (wt/vol). In one embodiment, the active agent (for example an active agent salt) is mixed with the metal alkoxide to provide an active agent-metal alkoxide complex, which is mixed with the BCP solution. The ratio of active agent to metal alkoxide may be 1:50 to 1:2 (wt/wt).

As used herein, the term "solvent" refers to a solvent that is capable of dissolving the copolymer, and in particular a block copolymer (BCP). Solvents useful for dissolving BCPs are known to the skilled person, and include alcohols such as isobutyl alcohol, tert-butyl alcohol, isopropyl alcohol, ethyl alcohol, ethyl acetate, methyl ethyl ketone etc. In one embodiment, the solvent is substrate-compatible (i.e. does not degrade the polymer surface). In one embodiment, the solvent or mixture of solvents used need to completely wet the substrate surface. In one embodiment, the solvent is an alcohol. In one embodiment, the solvent comprises a combination of alcohols. For example, when the substrate is a polyolefin, the solvent is typically selected from ethyl acetate/IPA, ethyl acetate/tert-butanol, and ethyl acetate/ethanol, in which the components of the solvent may be present in a ratio selected from 1/99 to 15/85 A ratio of up to 50% distilled or deionised water may also be used as one part in the solvent mixture depending on the substrate used. Thus, in one embodiment, the solvent is selected from ethyl acetate/IPA/distilled water, ethyl acetate/tert-butanol//distilled water, and ethyl acetate/ethanol/distilled water.

As used herein, the term "copolymer" refers to any macromolecule comprising two species of monomeric units in a polymerised form. The copolymer may be linear or branched, and may be an alternating, periodic, statistical, block, stereoblock, or gradient copolymer. Examples of copolymer include Polystyrene—polymethylmethacrylate, Polystyrene—polyisoprene, Polymethylmethacrylate—polymethyl disilane, Polyisoprene—polybutadiene, Polyethylene—polystyrene. In a preferred embodiment, the copolymer is a block copolymer (BCP).

As used herein, the terms "block-copolymer" or "BCP" refers to a linear copolymer consisting of a single chain and comprising two or more homopolymer subunits linked by covalent bonds. In one embodiment, the BCP comprises a first polymer and a second polymer. In one embodiment, the first polymer is selected from polystyrene, polybutadiene, polymethyl methacrylate, polyisoprene, polyethylene or any polyolefin. In one embodiment, the first polymer is PS. In one embodiment, the first polymer is PE. In one embodiment, the second polymer is selected from the group ethylene oxide, 4-vinylpyridine, methyl methacrylate, acrylic acid or lactic acid. In a preferred embodiment, the BCP is polystyrene-b-poly(X), where X is selected from ethylene oxide, 4-vinylpyridine, methyl methacrylate, acrylic acid and lactic acid. In another preferred embodiment, the BCP is PE-b-poly(X), where X is selected from ethylene oxide, 4-vinylpyridine, methyl methacrylate, acrylic acid and lactic acid. Other block copolymers suitable for the invention include any cationic, anionic or amphiphilic block-copolymer system and suitable examples are polystyrene-b-polylactide, polystyrene-b-polybutylene oxide, polymethyl methacrylate-b-polyacrylic acid, polybutadiene-b-polyethylene oxide. In one embodiment, the coating composition comprises 0.01 to 3% BCP, for example 0.1 to 3%, 0.1 to 2%, 0.1 to 1%, 1 to 2%, 2 to 3%, 1 to 3% (wt/v). In a preferred embodiment, the BCP employed is compatible with the substrate.

As used herein, the term "hydrolysed metal alkoxide precursor" or "hydrolysed metal alkoxide" refers to a hydrolysis product of a metal alkoxide such as tert-butoxide, isobutoxide, isopropoxide or ethoxide. These hydrolysis products may have terminal groups such as R—O—O—H, R—OH etc., where R is the oligomer of the inorganic functionality. In presence of the carboxylic acid stabilizer, the metal alkoxide may form extensive linked structures (oligomers) upon hydrolysis both by covalent bonding and chelation by the stabilizer. In one embodiment, the metal alkoxide precursor is selected from a titanium alkoxide, zirconium alkoxide or silicon alkoxide precursor. In one embodiment, the coating composition comprises 0.1 to 10% hydrolysed metal alkoxide precursor, for example 0.1 to 3%, 0.5 to 5%, 1 to 10%, 5 to 10% (wt/vol).

As used herein, the term "carboxylic acid stabiliser" refers to one of the long chain or short chain carboxylic acids containing the R—COOH group, where R refers to the rest of the molecule. Examples of carboxylic acids that can be used are acetic acid, propionic acid, oxalic acid, lauric acid, or any of the amino acids. In one embodiment, the coating composition comprises 0.5 to 10% carboxylic acid stabiliser, for example 0.5 to 5%, 1 to 10%, 5 to 10% (wt/vol).

As used herein, the term "substrate" typically refers to a polymer, ceramic, metal, metal alloy, silicon or glass substrate, or a combination thereof. The substrate may be rigid, semi-rigid, or a flexible. In one embodiment, the substrate is planar, for example a film or sheet. In one embodiment, the substrate is a polymer. In one embodiment, the polymer is a polyolefin, for example a thermoplastic polyolefin. In one embodiment, the substrate is polyolefin film for example a polyethylene film. In one embodiment, the substrate is a laminate comprising a polymer layer, for example a paper-polymer laminate film. The polymer may be a polyolefin such as a thermoplastic polyolefin, for example PE, polypropylene (PP), polymethylpentene (PMP), polybutene-1 (PB-1), or a polyolefin elastomers (POE), for example polyisobutylene (PIB), ethylene propylene rubber (EPR), ethylene propylene diene monomer (M-class) rubber (EPDM rubber). In one embodiment, the substrate is polyethylene, such as HDPE or LDPE.

As used herein, the term "activated" as applied to the surface of the substrate refers to a treatment of the surface to make it reactive, so that it can react with the coating composition. This is used when the substrate is a non-reactive substrate, such as a polyolefin. In one embodiment, the surface of the polyolefin is activated by UV/ozone, plasma or corona treatment. In one embodiment, an alcohol-based wetting layer is deposited on to the activated polyolefin surface, prior to deposition of the coating composition. When the substrate is a polyolefin, a polyolefin compatible solvent must be used to dissolve the BCP. In one embodiment, the solvent is selected from ethyl acetate/IPA, ethyl acetate/tert-butanol, or ethyl acetate/ethanol or a single solvent from this list. When the substrate is another polymer, for example a plastic, a single solvent may be employed.

As used herein, the term "cured" (or "annealed") as applied to the coated substrate refers to a heating process in which the coated substrate is heated to a certain temperature (for example 50-100° C.) for a period of time (generally less than 10 minutes) and then cooled at room temperature. The purpose of the curing process is to remove the solvents from the coated substrate.

As used herein, the term "very thin film" or "very thin coating" means a film or coating having a thickness of less than 250 nm, and preferably less than 200 nm or 150 nm.

EXEMPLIFICATION

The invention will now be described with reference to specific Examples. These are merely exemplary and for illustrative purposes only: they are not intended to be limiting in any way to the scope of the monopoly claimed or to the invention described. These examples constitute the best mode currently contemplated for practicing the invention.

Example 1

In one experiment, a 0.5% (wt/vol) PS-b-PEO BCP is dissolved in a 1:10 (vol ratio) ethyl acetate: IPA solvent mixture and kept stirring at a slightly elevated temperature (30-60° C.). A complex containing a hydrolysed titanium isopropoxide—silver nitrate is prepared separately by combining 2.5 g TTIP (titanium tetraisopropoxide), 2.7 g acetic acid, 1.6 g distilled water and 0.2 g silver nitrate. In the final step the BCP solution and titania-silver complex solution is combined and the sol is then topped up to the required dilution with an IPA-distilled water mix, in this experiment, to make a solution with solid content of 1-10%, as required, for example 3.2%. This sol is then stirred for a minimum of 5 hrs to homogenize.

LDPE films were treated under UV/ozone, plasma or corona for 2 seconds to 3 mins and subsequently wetted with the alcohol, for example IPA, to form an interlayer and the coating composition was then deposited by a simple dip/spray/slot die coating procedure. The coated substrates were then cured at 40-100° C. for a short time period (<10 min) to remove the solvents.

The films were then characterized by atomic force microscopy (AFM), scanning electron microscopy (SEM) etc. for visualizing film formation and successful samples were then analyzed for their antimicrobial activity against gram negative and gram positive bacteria or for their other relevant properties.

Example 2

In one experiment, a 0.3% (wt/vol) PE-b-PEO BCP is dissolved in a 1:10 (vol ratio) ethyl acetate: ethanol solvent mixture and kept stirring at a slightly elevated temperature (30-60° C.). A complex containing a hydrolysed titanium isopropoxide—silver nitrate is prepared separately by combining 2 g TTIP (titanium tetraisopropoxide), 0.8 g acetic acid, 1.3 g distilled water and 0.7 g silver nitrate. In the final step the BCP solution and titania-silver complex solution is combined and the sol is then topped up to the required dilution with an ethanol-distilled water mix, in this experiment, to make a solution with solid content of 1-10%, as required. This sol is then stirred for a minimum of 5 hrs to homogenize. LDPE films were treated under UV/ozone, plasma or corona discharge for 2 seconds to 3 mins and subsequently wetted with the alcohol, for example IPA, to form an interlayer and the coating composition was then deposited by a simple dip/spray/slot die coating procedure. The coated substrates were then cured at 40-100° C. for a short time period (<10 min) to remove the solvents.

The films were then characterized for their relevant properties.

Example 3

In one experiment, a 0.7% (wt/vol) PE-b-PEO BCP is dissolved in a 1:10 (vol ratio) ethyl acetate/tert-butanol solvent mixture and kept stirring at a slightly elevated temperature (30-60° C.). A complex containing a hydrolysed titanium isopropoxide—silver nitrate is prepared separately by combining 2.5 g TTIP (titanium tetraisopropoxide), 1.6 g acetic acid, 1.6 g distilled water and 1.4 g silver nitrate. In the final step the BCP solution and titania-silver complex solution is combined and the sol is then topped up to the required dilution with an ethanol-distilled water mix, in this experiment, to make a solution with solid content of 1-10%, as required. This sol is then stirred for a minimum of 5 hrs to homogenize.

LDPE films were treated under UV/ozone, plasma or corona discharge for 2 seconds to 3 mins and subsequently wetted with the alcohol, for example IPA, to form an interlayer and the coating composition was then deposited by a simple dip/spray/slot die coating procedure. The coated substrates were then annealed at 40-100° C. for a short time period (<10 min) to remove the solvents.

The films were then characterized for their relevant properties.

EQUIVALENTS

The foregoing description details presently preferred embodiments of the present invention. Numerous modifications and variations in practice thereof are expected to occur to those skilled in the art upon consideration of these descriptions. Those modifications and variations are intended to be encompassed within the claims appended hereto.

The invention claimed is:

1. A coated substrate comprising a substrate that is continuously and homogenously spray, dip, or slot die assisted coated with a coating composition at a thickness of less than 250 nm and then cured, wherein the coating composition is a sol comprising:
a polymer, wherein the polymer consists of a block copolymer that is compatible with the substrate;
alcohol solvent capable of dissolving the block copolymer and not degrading the substrate;
a hydrolysed metal alkoxide precursor;
a carboxylic acid stabiliser; and
an active agent selected from an ion, a molecule, a compound or a nanoparticle;
wherein the substrate is a polymer material provided as a sheet or film, and the composition is a polymeric sol comprising the active agent dispersed in a hydrolysed metal alkoxide-block copolymer matrix, and wherein the coating composition comprises less than 0.5% block copolymer by weight prior to curing.

2. The coated substrate according to claim 1, in which the polymer material provided as a sheet or film is a laminate material and optionally a paper-polymer laminate.

3. The coated substrate according to claim 1, in which the polymer material provided as a sheet or a film is a polyolefin and the block copolymer does not degrade the polyolefin.

4. The coated substrate according to claim 1, in which the polymer material provided as a sheet or a film is selected from HDPE and LDPE.

5. The coated substrate according to claim 1, in which the active agent is an antimicrobial agent.

6. The coated substrate according to claim 1, in which the active agent is configured to induce gas or water vapour barrier properties to the substrate.

7. The coated substrate according to claim 1, in which the coating composition comprises 0.5 to 5% hydrolysed metal alkoxide by weight.

8. A coated substrate comprising a substrate that is continuously and homogenously spray, dip, or slot die assisted coated with a coating composition at a thickness of less than 250 nm and then cured, wherein the coating composition is a sol consisting of:
a block copolymer that is compatible with the substrate;
alcohol solvent capable of dissolving the block copolymer and not degrading the substrate;
a hydrolysed metal alkoxide precursor;
a carboxylic acid stabiliser; and
an active agent selected from an ion, a molecule, a compound or a nanoparticle;
wherein the substrate is a polymer material provided as a sheet or film, and the composition is a polymeric sol comprising the active agent dispersed in a hydrolysed metal alkoxide-block copolymer matrix; and
wherein the coating composition comprises less than 0.5% block copolymer by weight prior to curing.

9. A coated substrate comprising a substrate that is continuously and homogenously spray, dip, or slot die assisted coated with a coating composition at a thickness of less than 250 nm and then cured, wherein the coating composition is a sol consisting of:
a block copolymer that is compatible with the substrate;
alcohol solvent capable of dissolving the block copolymer and not degrading the substrate;
a hydrolysed metal alkoxide precursor;
a carboxylic acid stabiliser; and
an active agent selected from an ion, a molecule, a compound or a nanoparticle;
wherein the substrate is a polymer material provided as a sheet or film, and the composition is a polymeric sol comprising the active agent dispersed in a hydrolysed metal alkoxide-block copolymer matrix;
wherein the coating composition comprises less than 0.5% block copolymer by weight;
wherein the block copolymer comprises a first polymer and a second polymer;
wherein first polymer is selected from the group consisting of:
polystyrene, polybutadiene, polymethyl methacrylate, polyisoprene, polyethylene, and
any polyolefin; and
wherein the second polymer is a poly(X) wherein X is selected from the group consisting of:
ethylene oxide, 4-vinylpyridine, methyl methacrylate, acrylic acid, and lactic acid.

* * * * *